US012637078B2

(12) United States Patent
Dolinaj et al.

(10) Patent No.: US 12,637,078 B2
(45) Date of Patent: May 26, 2026

(54) METHOD AND DEVICE FOR ACCELERATING A MOTOR VEHICLE

(71) Applicant: Bayerische Motoren Werke Aktiengesellschaft, Munich (DE)

(72) Inventors: Helena Dolinaj, Munich (DE); Miguel Loenne, Munich (DE); Sebastien Mathieu, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/860,435

(22) PCT Filed: Apr. 21, 2023

(86) PCT No.: PCT/EP2023/060416
§ 371 (c)(1),
(2) Date: Oct. 25, 2024

(87) PCT Pub. No.: WO2023/213565
PCT Pub. Date: Nov. 9, 2023

(65) Prior Publication Data
US 2025/0289430 A1      Sep. 18, 2025

(30) Foreign Application Priority Data

May 6, 2022     (DE) ..................... 10 2022 111 304.3

(51) Int. Cl.
B60W 30/18 (2012.01)
B60W 30/14 (2006.01)
B60W 30/20 (2006.01)

(52) U.S. Cl.
CPC .... B60W 30/18072 (2013.01); B60W 30/143 (2013.01); B60W 30/20 (2013.01); B60W 2520/10 (2013.01); B60W 2556/50 (2020.02)

(58) Field of Classification Search
CPC .... B60W 10/02; B60W 10/04; B60W 30/143; B60W 30/16; B60W 30/20;
(Continued)

(56) References Cited

U.S. PATENT DOCUMENTS 11,787,405 B1 * 10/2023 He .................. B60W 30/18072
701/96
2012/0046841 A1     2/2012 Wurthner et al.
(Continued)

FOREIGN PATENT DOCUMENTS

DE      10 2009 002 521 A1    10/2010
DE      10 2009 046 340 A1     5/2011
(Continued)

OTHER PUBLICATIONS

DE 102011109039 English Translation Version (Year: 2012).*
(Continued)

*Primary Examiner* — Hai H Huynh
*Assistant Examiner* — Johnny H Hoang
(74) *Attorney, Agent, or Firm* — Crowell & Moring LLP

(57) ABSTRACT

A device for controlling the coasting mode of a vehicle in the context of a distance control and/or speed control function of the vehicle. The device is designed to determine that, upon exiting the coasting mode, the vehicle has an actual vehicle speed which lies below a target speed of the distance control and/or speed control function and/or an actual distance to a preceding vehicle, the actual distance lying above a target distance of the distance control and/or speed control function. In response thereto, the device is additionally designed to produce a coasting mode acceleration, which is reduced in comparison to a standard acceleration of the distance control and/or speed control function, for the vehicle in
(Continued)

order to bring the actual speed closer to the target speed and/or in order to bring the actual distance closer to the target distance.

16 Claims, 2 Drawing Sheets

(58) Field of Classification Search

CPC ....... B60W 30/18072; B60W 50/0097; B60W 2520/10; B60W 2554/4042; B60W 2554/802; B60W 2720/106; B60W 2556/50; B60W 2720/103; B60W 2030/1809; Y02T 10/60

USPC ...................................................... 701/70–92

See application file for complete search history.

(56) References Cited

U.S. PATENT DOCUMENTS

| | | |
|---|---|---|
| 2012/0220424 A1 | 8/2012 | Staudinger et al. |
| 2015/0232098 A1* | 8/2015 | Crombez ............. F02D 11/105 |
| | | 701/110 |
| 2019/0100208 A1 | 4/2019 | Plianos et al. |
| 2019/0100209 A1 | 4/2019 | Plianos et al. |
| 2020/0282995 A1* | 9/2020 | Jeon ..................... B60W 30/143 |
| 2023/0406309 A1* | 12/2023 | Seo ................. B60W 30/18163 |
| 2024/0400086 A1* | 12/2024 | He ...................... B60W 60/001 |

FOREIGN PATENT DOCUMENTS

| | | |
|---|---|---|
| DE | 10 2011 109 039 A1 | 1/2012 |
| DE | 10 2017 102 076 A1 | 7/2018 |
| DE | 10 2018 215 976 A1 | 4/2019 |
| FR | 3 054 496 A1 | 2/2018 |
| JP | 5-209545 A | 8/1993 |

OTHER PUBLICATIONS

International Search Report (PCT/ISA/210) issued in PCT Application No. PCT/EP2023/060416 dated Jul. 31, 2023 with English translation (7 pages).

German-language Written Opinion (PCT/ISA/237) issued in PCT Application No. PCT/EP2023/060416 dated Jul. 31, 2023 with English translation (9 pages).

German-language Search Report issued in German Application No. 10 2022 111 304.3 dated Dec. 20, 2022 with partial English translation (11 pages).

* cited by examiner

METHOD AND DEVICE FOR ACCELERATING A MOTOR VEHICLE

BACKGROUND AND SUMMARY

The invention relates to a motor vehicle designed to be operated in a coasting mode. In particular, the invention relates to a method and a corresponding device for accelerating a motor vehicle upon exit from a coasting mode of the vehicle.

A vehicle having an internal combustion engine can be designed to temporarily decouple the internal combustion engine from the drivetrain of the vehicle during a journey and possibly deactivate it to reduce the energy consumption of the vehicle. In other words, the vehicle can be designed to be temporarily operated in the coasting mode during a journey.

The present document relates to the technical problem of enabling a particularly comfortable coasting mode of a vehicle in an efficient manner, in particular in conjunction with a distance and/or speed control function of the vehicle.

The object is achieved by each of the independent claims. Advantageous embodiments are described, inter alia, in the dependent claims. It is to be noted that additional features of a claim dependent on an independent claim, without the features of the independent claim or in combination with only a subset of the features of the independent claim, can form a separate invention independent of the combination of all features of the independent claim, which can be made the subject matter of an independent claim, a divisional application, or a subsequent application. This applies in the same manner to technical teachings described in the description which can form an invention independent of the features of the independent claims.

According to one aspect, a (control) device for controlling the coasting mode of a (motor) vehicle in the context of a distance and/or speed control function of the vehicle is described. During the operation of the distance and/or speed control function, the driving speed can be adapted automatically in dependence on a target distance (defined by the driver) to the preceding vehicle driving (directly) in front of the vehicle and/or (during a free drive) in dependence on a target speed (defined by the driver), in particular controlled (to the target distance and/or to the target speed).

The device can be configured to decouple the drive motor (in particular the internal combustion engine) of the vehicle from the drivetrain of the vehicle (and possibly to deactivate the drive motor) in order to start the coasting mode. Alternatively or additionally, the device can be configured to couple the drive motor with the drivetrain of the vehicle (and possibly to activate the drive motor) in order to end the coasting mode. The vehicle can roll in the coasting mode without action of a drive torque and/or a drag torque of the drive motor.

During the coasting mode of the vehicle, typically no drive torque is therefore caused by the drive motor of the vehicle. No braking torque (due to one or more friction brakes of the vehicle) can possibly also be effectuated during the coasting mode. Therefore, possibly no active distance and/or speed control function can take place during the coasting mode. However, it can be monitored in this case that during the coasting mode the distance of the vehicle to the preceding vehicle remains within a predefined tolerance band around the target distance and/or that the driving speed of the vehicle remains within a predefined tolerance band around the target speed. An active distance and/or speed control function (to the target distance or to the target speed)

can take place outside the coasting mode. In particular, in this case it is possible to cause the distance and/or the driving speed to be adjusted to the target distance or to the target speed directly after ending the coasting mode.

The device is configured to determine that the vehicle, upon exit from the coasting mode (in particular at the exit driving progression of the exit from the coasting mode), has an actual driving speed which is below the target speed of the distance and/or speed control function (for example, by 5% or more, or by 10% or more), and/or has an actual distance to a preceding vehicle, which is above the target distance of the distance and/or speed control function (for example, by 5% or more, or by 10% or more). This can be ascertained on the basis of sensor data from one or more surroundings sensors (for example, from a radar sensor) and/or from one or more status sensors (for example, from a speed sensor).

It can therefore be detected that the vehicle, upon exit from the coasting mode, has an excessively low driving speed and/or an excessively high distance for the distance and/or speed control function. In such a situation, a standard acceleration can be effectuated in a case without reference to the coasting mode in the context of the distance and/or speed control function.

In particular, the device can be configured to repeatedly detect in the context of the distance and/or speed control function (if no coasting exit has taken place within a specific preceding period of time or within a specific preceding driving distance) that the actual speed is below the target speed and/or that the actual distance is above the target distance. The standard acceleration can then be effectuated in reaction thereto in order to adjust, in particular control, the actual speed to the target speed and/or the actual distance to the target distance. In the distance and/or speed control function, a standard acceleration can therefore be effectuated as a standard measure in order to keep the vehicle at the target speed and/or at the target distance.

The standard acceleration effectuated in the context of the distance and/or speed control function can depend on the extent of the deviation (i.e., the difference) between actual speed and the target speed and/or between the actual distance and the target distance.

The device can be configured to repeatedly ascertain the difference between the actual speed and the target speed and/or between the actual distance and the target distance in the context of the distance and/or speed control function (if no coasting exit has taken place within a specific preceding period of time or within a specific preceding driving distance). The value of the standard acceleration can then be ascertained in dependence on the respective difference, in particular using a predefined and/or stored relationship between the value of the standard acceleration and the difference. The value of the standard acceleration typically increases with increasing difference value. A particularly reliable distance and/or speed control function can thus be effectuated.

The device can be configured (deviating from the standard mode of the distance and/or speed control function), upon an exit from the coasting mode, to effectuate a coasting exit acceleration of the vehicle reduced in relation to the standard acceleration of the distance and/or speed control function, in order to approximate the actual speed to the target speed and/or to approximate the actual distance to the target distance. The coasting exit acceleration can be 10% or more, in particular 20% or more, below the standard acceleration.

The device can be configured in particular to effectuate the (reduced) coasting exit acceleration of the vehicle for a predefined driving progression range directly following the exit from the coasting mode. The standard acceleration of the distance and/or speed control function can then be effectuated subsequently to the predefined driving progression range. The driving progression range can be a specific period of time (for example, of 1 second or more, and/or of 10 seconds or less) after the exit time of the exit from the coasting mode. Alternatively or additionally, the driving progression range can be a specific driving distance (for example, 10 m or more, and/or 100 m or less), after the exit position of the exit from the coasting mode.

As described above, the value of the standard acceleration can be dependent on the difference between the actual speed and the target speed and/or on the difference between the actual distance and the target distance. In a corresponding manner, the value of the coasting exit acceleration can also be dependent on the difference between the actual speed and the target speed and/or on the difference between the actual distance and the target distance. The device can be configured, in the driving progression range (directly) following the exit from the coasting mode, to effectuate a coasting exit acceleration having a value which is less than the respective value of the standard acceleration (for example is less, by 10% or more, in particular 20% or more, than the respective value of the standard acceleration) at least for a part of the driving progression range or for the entire driving progression range.

A device is therefore described which is configured, in the context of the distance and/or speed control function, to selectively effectuate a coasting exit acceleration reduced in relation to the standard acceleration upon a coasting exit. The comfort of the distance and/or speed control function can thus be increased in an efficient manner.

The coasting exit acceleration effectuated by the device can be designed such that the actual driving speed directly following the exit from the coasting mode, in particular for the (entire) predefined driving progression range directly following the exit from the coasting mode, essentially has no jerk. The jerk typically corresponds to the second (time) derivative of the driving speed of the vehicle. The coasting exit acceleration can be such that the jerk is less an absolute value than a predefined jerk threshold value (within the entire driving progression range). The jerk threshold value can be below the perceptibility limit for a human.

The device can be configured in particular to ascertain the profile of the actual driving speed of the vehicle in a specific (temporal and/or distance) range before and/or at the exit driving progression, at which the exit from the coasting mode takes place.

The coasting exit acceleration can then be ascertained in dependence on the ascertained profile of the actual driving speed of the vehicle, in particular such that the actual driving speed of the vehicle (directly) following the exit driving progression (possibly for the entire predefined driving progression range) has substantially no jerk (for example, in absolute value is below the jerk threshold value).

A particularly comfortable distance and/or speed control function can be effectuated by effectuating a jerk-free acceleration following a coasting exit.

The device can be configured to predict a distance and/or speed profile of the vehicle in the coasting mode proceeding from a current driving progression of the vehicle (e.g., proceeding from the current time and/or proceeding from the current position). The predicted distance and/or speed profile can indicate the temporal and/or spatial distance of the vehicle to the preceding vehicle driving (directly) in front of the vehicle and/or the driving speed of the vehicle as a function of the driving progression (proceeding from the current driving progression). The predicted distance and/or speed profile can extend here proceeding from the current driving progression over a predefined prediction horizon.

The driving progression can indicate the position of the vehicle along the roadway traveled by the vehicle or correspond thereto. Alternatively or additionally, the driving progression can indicate the respective point in time during the journey of the vehicle or correspond thereto. The prediction horizon can therefore correspond to a specific distance and/or time horizon (e.g., 100 m or more, or 500 m or more; or 10 seconds or more, or 20 seconds or more).

The device can be configured to ascertain an upcoming gradient profile of the roadway traveled by the vehicle (for the prediction horizon). This information can be ascertained on the basis of a digital map for the roadway network traveled by the vehicle. The distance and/or speed profile of the vehicle in the coasting mode can then be predicted in a precise manner on the basis of the upcoming gradient profile.

The device can furthermore be configured to ascertain status data with respect to the status (e.g., the current driving speed) of the vehicle and/or with respect to the status (e.g., the current driving speed) of the preceding vehicle driving in front of the vehicle. The distance and/or speed profile of the vehicle in the coasting mode can then be predicted in a particularly precise manner on the basis of the status data.

Upon the prediction of the distance and/or speed profile of the vehicle, it can be assumed that the vehicle is in the coasting mode during the entire prediction horizon. Furthermore, an assumption with respect to the behavior of the preceding vehicle during the prediction horizon can be made. For example, it can be assumed that the driving speed of the preceding vehicle remains constant during the entire prediction horizon.

The device is furthermore configured to compare the predicted distance and/or speed profile of the vehicle to the target distance or to a distance threshold value lying above the target distance. Alternatively or additionally, the device can be configured to compare the predicted distance and/or speed profile to the target speed or to a speed threshold value of the distance and/or speed control function of the vehicle lying below the target speed. The following can be ascertained in the scope of the method, for example:

the driving progression section in which the predicted distance and/or speed profile remains within a predefined tolerance band around the target distance and/or around the target speed; and/or the driving progression at which the predicted distance and/or speed profile reaches the target distance or the distance threshold value or the target speed or the speed threshold value (and possibly subsequently exceeds or falls below it).

The coasting mode can then be controlled in dependence on the comparison (in particular in dependence on the ascertained driving progression section and/or in dependence on the ascertained driving progression), in particular can be started or ended. A particularly energy-efficient and comfortable coasting mode of a vehicle having active distance and/or speed control function can thus be effectuated. During the distance and/or speed control function and/or during the coasting mode, it is possible to deviate here at least temporarily and/or within a specific tolerance band from the target distance and/or from the target speed. The tolerance band or the respective threshold value can be, for example, ±5% or less or ±10% or less of the target distance or the target speed.

According to a further aspect, a (road) motor vehicle (in particular a passenger vehicle or a truck or a bus or a motorcycle) is described which comprises the (control) device described in this document.

According to a further aspect, a method for controlling the coasting mode of a vehicle in the context of a distance and/or speed control function of the vehicle is described. The method comprises determining that the vehicle, upon exit from the coasting mode, has an actual driving speed which is below the target speed of the distance and/or speed control function, and/or has an actual distance to the preceding vehicle which is above the target distance of the distance and/or speed control function. The method furthermore comprises, in reaction thereto, effectuating a coasting exit acceleration of the vehicle reduced in relation to a standard acceleration of the distance and/or speed control function, in order to approximate the actual speed to the target speed and/or in order to approximate the actual distance to the target distance.

According to a further aspect, a software (SW) program is described. The SW program can be configured to be executed on a processor (e.g., a control unit of a vehicle), and in order to thus carry out the method described in this document.

According to a further aspect, a storage medium is described. The storage medium can comprise an SW program which is configured to be executed on a processor and to thus carry out the method described in this document.

It is to be noted that the methods, devices, and systems described in this document can be used both alone and in combination with other methods, devices, and systems described in this document. Furthermore, any aspects of the methods, devices, and systems described in this document can be combined with one another in a variety of ways. In particular, the features of the claims can be combined with one another in a variety of ways. Furthermore, features set forth between parentheses are to be understood as optional features.

The invention will be described in more detail hereinafter on the basis of exemplary embodiments. In the figures

DETAILED DESCRIPTION OF THE DRAWINGS

Figure 1:
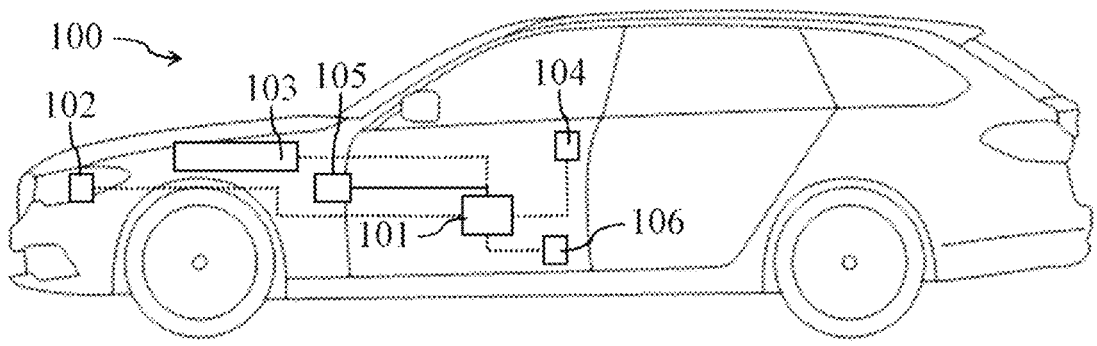
FIG. 1 shows exemplary components of a vehicle.

As described at the outset, the present document relates to increasing the comfort of the coasting mode of a motor vehicle. In this context, FIG. 1 shows an exemplary vehicle 100. The vehicle 100 comprises one or more surroundings sensors 102 (e.g., at least one camera, a radar sensor, a lidar sensor, and/or an ultrasonic sensor), which are configured to acquire surroundings data (i.e., sensor data) with respect to the surroundings of the vehicle 100. Furthermore, the vehicle 100 comprises one or more vehicle sensors 106, which are configured to acquire status data (i.e., sensor data) with respect to a status (for example, with respect to the driving speed) of the vehicle 100.

A (control) device 101 of the vehicle 100 can be configured to operate the drive motor 103 (in particular the internal combustion engine) of the vehicle 100 in dependence on the surroundings data and/or the status data in order to longitudinally guide the vehicle 100 in an at least partially automated manner. In particular an automatic distance and/or speed control function (in particular ACC, adaptive cruise control) can be effectuated here, in which the driving speed of the vehicle 100 is adjusted automatically in order to adjust the distance of the vehicle 100 to a preceding vehicle driving directly in front of the vehicle 100 to a target distance (which was defined by the driver of the vehicle 100, for example) and/or to adjust the driving speed of the vehicle 100 during a free drive (without preceding vehicle) to a target speed (which was defined by the driver of the vehicle 100, for example).

Figure 2A:
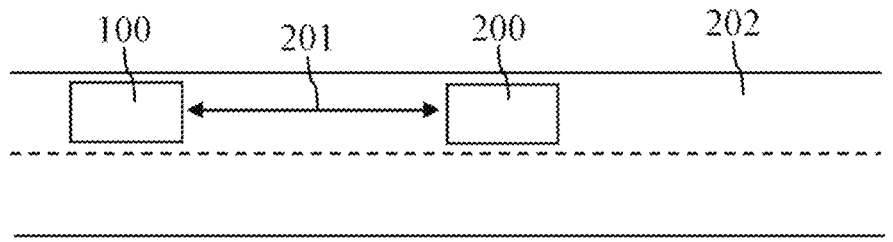
FIG. 2a shows an exemplary driving situation of a vehicle.

FIG. 2a shows an exemplary driving situation in which the vehicle 100 drives on a roadway 202 behind a preceding vehicle 200. The distance 201 between the vehicle 100 and the preceding vehicle 200 is set by the device 101 of the vehicle 100 to a specific target distance. The distance 201 can be a spatial distance here, which corresponds to the spatial distance (for example, measured in meters) between the vehicle 100 and the preceding vehicle 200. Alternatively or additionally, the distance 201 can be a temporal distance, which corresponds to the time the vehicle 100 would require at the current driving speed in order to reach the preceding vehicle 200 (under the assumption that the preceding vehicle 200 is stationary). The temporal distance can correspond, for example, to the quotient of the current driving speed of the vehicle 100 and the spatial distance between the vehicle 100 and the preceding vehicle 200.

The (control) device 101 can be configured to operate the vehicle 100 at least temporarily in a so-called coasting mode during an active distance and/or speed control function. For this purpose, the coupling 105 of the vehicle 100 can be prompted to decouple the drive motor 103 from the drivetrain of the vehicle 100, in particular from the one or more driven wheels of the vehicle 100. Furthermore, a deactivation and/or a setting aside of the drive motor 103 can be effectuated. The vehicle 100 then rolls (without drag torque and/or without drive torque of the drive motor 103) over the roadway 202 traveled by the vehicle 100. The energy consumption of the vehicle 100 can thus be reduced.

The vehicle 100 can comprise a position sensor 104 which is configured to acquire position data (i.e., sensor data) with respect to the respective current position of the vehicle 100. The position data can comprise, for example, coordinates of a global navigation satellite system (GNSS), such as GPS coordinates. The device 101 can be configured to ascertain the spatial profile of the roadway 202, on which the vehicle 100 is being driven, on the basis of the position data and on the basis of a digital map with respect to the roadway network traveled by the vehicle 100. A driving route through the roadway network can optionally have been planned by means of a navigation system of the vehicle 100. It can be recognized on the basis of the driving route along which roadway 202 the vehicle 100 will be driven proceeding from the current time and/or proceeding from the current position. Furthermore, the spatial profile, in particular the gradient profile, of the upcoming roadway 202 can be ascertained on the basis of the digital map.

Figure 2B:
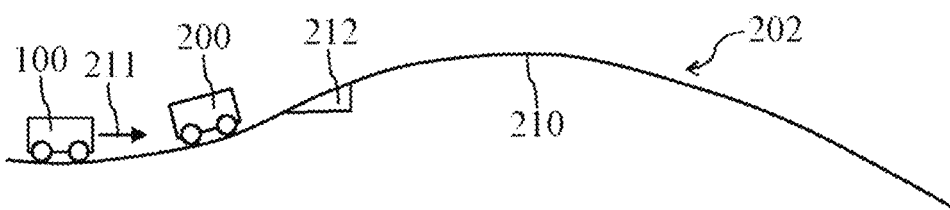
FIG. 2b shows an exemplary gradient profile of a roadway.

FIG. 2b shows an exemplary gradient profile 210 of the roadway 202 traveled by the vehicle 100. The gradient profile 210 indicates the gradient 212 of the roadway 202 as a function of the position on the roadway 202 and/or as a function of the time during a journey (in general as a function of the driving progression of the vehicle 100).

The device 101 can be configured to predict a distance profile and/or a speed profile of the vehicle 100 in the coasting mode on the basis of the gradient profile 210 of the upcoming roadway 202. The distance profile can indicate the (temporal and/or spatial) distance 201 of the vehicle 100 to the preceding vehicle 200, as a function of the position and/or as a function of the time (in general as a function of the driving progression). The speed profile can indicate the driving speed of the vehicle 100 as a function of the position and/or as a function of the time (in general as a function of the driving progression). It can be assumed here that the vehicle 100 is operated in the coasting mode (without action of a drive and/or braking torque generated by the vehicle 100). Furthermore, (to ascertain the distance profile), a specific speed behavior of the preceding vehicle 200 can be assumed; for example, it can be assumed that the preceding vehicle 200 is driven at a constant driving speed. The distance profile and/or the speed profile can be predicted, for example, for a spatial prediction horizon of 50 m or more, or of 100 m or more (proceeding from the current position of the vehicle 100) and/or for a temporal prediction horizon of 5 seconds or more, or of 10 seconds or more.

The activation (also referred to as the entry) and/or the deactivation (also referred to as the exit) of the coasting mode of the vehicle 100 can then be carried out in a precise and energy-efficient manner (during use of the distance and/or speed control function) in dependence on the predicted distance profile and/or in dependence on the predicted speed profile. In particular, the device 101 of the vehicle 100 can be configured (during the operation of the distance and/or speed control function) to predict a distance profile and/or a speed profile of the vehicle 100 in the coasting mode proceeding from the current position of the vehicle 100 and/or proceeding from the current time (in general proceeding from the current driving progression). An entry into or an exit out of the coasting mode can then be effectuated in dependence on the predicted distance profile and/or speed profile.

The device 101 can be configured to effectuate a standard acceleration during the operation of the distance and/or speed control function if it is detected that the actual distance 201 is greater than the target distance and/or that the actual driving speed is less than the target speed. Standard acceleration can have a specific standard acceleration value with which the vehicle 100 is accelerated. The acceleration can be effectuated by the drive motor 103 of the vehicle 100.

Figure 3:
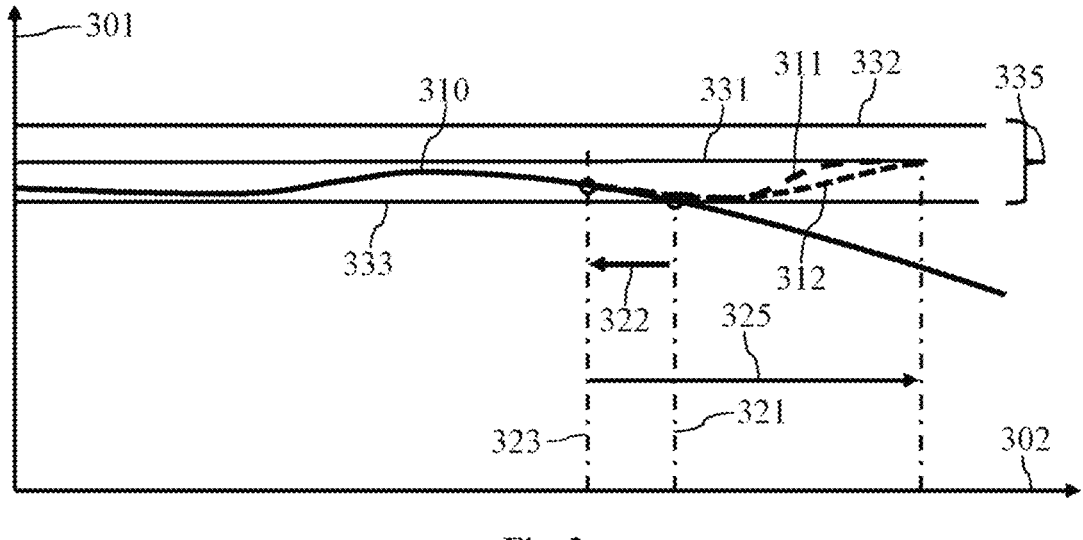
FIG. 3 shows an exemplary coasting rollout curve.

FIG. 3 shows an exemplary predicted distance and/or speed profile 310 during the coasting mode of the vehicle 100. As already described, the distance and/or speed profile 310 indicates the actual distance and/or the actual speed 301 of the vehicle 100 as a function of the driving progression 302 (for example, the position and/or the time) during the journey of the vehicle 100.

FIG. 3 furthermore shows an exemplary tolerance band 335 around the target distance and/or around the target speed 331, having a lower threshold value 333 and an upper threshold value 332, which includes the target distance and/or the target speed 331. In FIG. 3, in particular a tolerance band 335 is shown around the target speed 331 (for a speed control function after exit from the coasting mode). The aspects described in this document are applicable accordingly for a distance control function after exiting from the coasting mode.

The device 101 can be configured to determine on the basis of the predicted distance and/or speed profile 310 that the predicted distance and/or speed profile 310 will intersect a threshold value 332, 333 of the tolerance band 335 at an intersection driving progression 321 (in particular the lower threshold value 333 of the speed tolerance band 335 and/or the upper threshold value 332 of the distance tolerance band 335).

The device 101 can furthermore be configured to effectuate an exit from the coasting mode at an exit driving progression 323 which is before the intersection driving progression 321 by a specific offset value 332. The vehicle 100 can have an actual driving speed 301 at the exit driving progression 323, which lies below the target speed 331 (and/or can have an actual distance 301 which lies above the target distance 331).

The device 101 can be configured to effectuate an acceleration of the vehicle 100 (immediately) after the exit from the coasting mode in the context of the distance and/or speed control function, in order to accelerate the vehicle 100 to the target speed 331 and/or in order to cause the vehicle 100 to have the target distance 331. The standard acceleration of the distance and/or speed control function can be applied here, by which the speed profile 311 shown in FIG. 3 is effectuated.

The effectuation of a relatively high standard acceleration following the coasting mode can be perceived as uncomfortable by a user of the vehicle 100. In particular, a jerk perceived as unpleasant can be caused by the standard acceleration.

The device 101 can be configured, following the coasting mode in the context of the distance and/or speed control function, to effectuate a coasting exit acceleration reduced in relation to the standard acceleration so that, for example, the speed profile (or distance profile) 312 shown in FIG. 3 results. In particular, a coasting exit acceleration can be effectuated by which a (noticeable) jerk of the vehicle 100 is avoided. The coasting exit acceleration can in particular be such that during the coasting exit and in a specific phase (i.e., in a specific driving progression range 325), which directly follows the coasting exit, the second derivative of the driving speed of the vehicle 100 is substantially zero. A particularly comfortable coasting exit can thus be effectuated.

At the end of the coasting process, the actual driving speed 301 of the vehicle 100 can be at the lower end 333 of the tolerance band 335 (for example, due to incorrect mapping and/or due to an incorrect prediction of the distance and/or speed profile 310). As a result thereof, it is necessary to accelerate back to the set speed 331 of the longitudinal guidance after ending the coasting process. A regular acceleration process using the standard acceleration can result in a noticeable jerk, which can be perceived by a user of the vehicle 100 and/or can make the user aware of the coasting process (so that the coasting process is no longer embedded unnoticed in the driving mode of the vehicle 100).

As described in this document, upon ending the coasting process with an actual driving speed 301 which lies below the target speed 331, a reduced coasting exit acceleration can be effectuated to achieve the target speed 331 within a specific (settable) driving progression range 325 (for example, within a specific period of time), in order to make the transition from coasting into free driving particularly comfortable.

Figure 4:
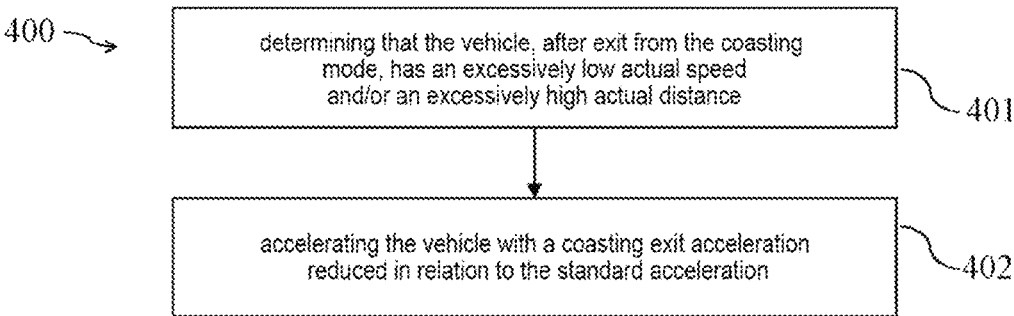
FIG. 4 shows a flow chart of an exemplary method for accelerating a vehicle.

FIG. 4 shows a flow chart of a (possibly computer-implemented) method 400 for controlling the coasting mode of a vehicle 100 in the context of a distance and/or speed control function of the vehicle 100. In the context of the distance and/or speed control function, the actual speed 301 of the vehicle 100 (during free driving) can be adjusted, in particular controlled, to a specific target speed 331. Alternatively or additionally, the actual distance 301 of the vehicle 100 to a preceding vehicle 100 (during a following journey) can be adjusted, in particular controlled, to a specific target distance 331. Upon falling below the target speed 331 and/or upon exceeding the target distance 331, a specific standard acceleration of the vehicle 100 can be effectuated in order to cause the adjustment of the driving speed 301 and/or the distance 301.

The standard acceleration can be stored in a storage unit of the vehicle 100 and/or defined for the operation of the distance and/or speed control function. The value of the standard acceleration can depend on the difference between actual speed 301 and target speed 331 and/or on the difference between actual distance 301 and target distance 331. The value of the standard acceleration can increase with increasing absolute value of the difference. The functional relationship between the difference and the value of the standard acceleration can be stored in the storage unit of the vehicle 100.

The method 400 comprises determining 401 that the vehicle 100, upon exit from the coasting mode, has an actual driving speed 301 which is below the target speed 331 of the distance and/or speed control function, and/or has an actual distance 301 to a preceding vehicle 200, which is above the target distance 331 of the distance and/or speed control function. The value of the difference between actual speed 301 and target speed 331 and/or between actual distance 301 and target distance 331 can possibly be ascertained here upon exit from the coasting mode (in particular at the exit driving progression 323).

The method 400 furthermore comprises, in reaction thereto, effectuating 402 a coasting exit acceleration of the vehicle 100 reduced in relation to the standard acceleration of the distance and/or speed control function, in order to approximate the actual speed 301 to the target speed 331 and/or to approximate the actual distance 301 to the target distance 331. The reduced coasting exit acceleration can be effectuated for a specific driving progression range 325 directly following the exit driving progression 323.

The value of the reduced coasting exit acceleration can in this case be below (for example, by 10% or more or by 20% or more) the value of the standard acceleration (for the respective difference value between actual speed 301 and target speed 331 and/or between actual distance 301 and target distance 331).

The value of the standard acceleration can change within the driving progression range 325 (in dependence on the changing difference between actual speed 301 and target speed 331 and/or between actual distance 301 and target distance 331). The coasting exit acceleration can be selected such that the value of the coasting exit acceleration is below (for example, by 10% or more or by 20% or more) the value of the standard acceleration at least in a part of the driving progression range 325 or for the entire driving progression range 325.

The comfort of the coasting mode of a vehicle 100 in conjunction with a distance and/or speed control function can be enhanced in an efficient and robust manner by the measures described in this document.

The present invention is not restricted to the exemplary embodiments shown. In particular, it is to be noted that the description and the figures are only to illustrate the principle of the proposed methods, devices, and systems by way of example.

The invention claimed is:

1. A device for controlling a coasting mode of a vehicle in a context of a distance and speed control function of the vehicle, wherein the device is configured:

to determine that the vehicle, upon an exit from the coasting mode, has an actual driving speed which is below a target speed of the distance and speed control function, or has an actual distance to a preceding vehicle, which is above a target distance of the distance and speed control function;

in reaction thereto to effectuate a coasting exit acceleration of the vehicle reduced in relation to a standard acceleration of the distance and speed control function, in order to approximate the actual speed to the target speed or in order to approximate the actual distance to the target distance;

to predict a distance and speed profile of the vehicle in the coasting mode;

on a basis of the predicted distance and speed profile, to ascertain an exit driving progression for the exit from the coasting mode;

to effectuate the exit from the coasting mode at the exit driving progression;

to compare, as a first comparison, the predicted distance and speed profile to a speed threshold value lying below the target speed;

to compare, as a second comparison, the predicted distance and speed profile to a distance threshold value lying above the target distance; and to ascertain the exit driving progression based on the first and second comparisons.

2. The device according to claim 1, wherein the device is configured:

to effectuate the coasting exit acceleration of the vehicle for a predefined driving progression range directly following the exit from the coasting mode; and following the predefined driving progression range, to effectuate the standard acceleration of the distance and speed control function.

3. The device according to claim 2, wherein the coasting exit acceleration is designed such that the actual driving speed directly following the exit from the coasting mode, in particular for the predefined driving progression range directly following the exit from the coasting mode, has no jerk.

4. The device according to claim 2, wherein the device is configured:

to ascertain a profile of the actual driving speed of the vehicle in a range before or at an exit driving progression, at which the exit from the coasting mode takes place; and to ascertain the coasting exit acceleration in dependence on the ascertained profile of the actual driving speed of the vehicle, such that the actual driving speed of the vehicle has substantially no jerk following the exit driving progression.

5. The device according to claim 2, wherein the device is configured, repeatedly in the context of the distance and speed control function, to detect that the actual speed is below the target speed and that the actual distance is above the target distance; and in reaction thereto, to effectuate the standard acceleration in order to control the actual speed to the target speed and the actual distance to the target distance.

6. The device according to claim 2, wherein the standard acceleration is 10% or more above the coasting exit acceleration.

7. The device according to claim 6, wherein the standard acceleration is 20% or more above the coasting exit acceleration.

8. The device according to claim 2, wherein the device is configured, repeatedly in the context of the distance and speed control function, to ascertain a difference between the actual speed and the target speed and between the actual distance and the target distance, to ascertain a value of the standard acceleration in dependence on the respective difference, in particular using a predefined relationship between the value of the standard acceleration and the difference; and in a driving progression range following the exit from the coasting mode, to effectuate a coasting exit acceleration having a value which is less than the respective value of the standard acceleration at least for a part of the driving progression range or for an entirety driving progression range.

9. The device according to claim 1, wherein the coasting exit acceleration is designed such that the actual driving speed directly following the exit from the coasting mode, in particular for a predefined driving progression range directly following the exit from the coasting mode, has no jerk.

10. The device according to claim 1, wherein the device is configured:

to ascertain a profile of the actual driving speed of the vehicle in a range before or at an exit driving progression, at which the exit from the coasting mode takes place; and to ascertain the coasting exit acceleration in dependence on the ascertained profile of the actual driving speed of the vehicle, such that the actual driving speed of the vehicle has substantially no jerk following the exit driving progression.

11. The device according to claim 1, wherein the predicted distance and speed profile indicates the temporal and spatial distance of the vehicle to the preceding vehicle driving in front of the vehicle and the driving speed of the vehicle as a function of the driving progression; or the predicted distance and speed profile extends proceeding from the current driving progression over a predefined prediction horizon; and the driving progression comprises a position of the vehicle along a roadway traveled by the vehicle and a time during a journey of the vehicle.

12. The device according to claim 1, wherein the device is configured, repeatedly in the context of the distance and speed control function, to detect that the actual speed is below the target speed and that the actual distance is above the target distance; and in reaction thereto, to effectuate the standard acceleration in order to control the actual speed to the target speed and the actual distance to the target distance.

13. The device according to claim 1, wherein the standard acceleration is 10% or more above the coasting exit acceleration.

14. The device according to claim 13, wherein the standard acceleration is 20% or more above the coasting exit acceleration.

15. The device according to claim 1, wherein the device is configured, repeatedly in the context of the distance and speed control function, to ascertain a difference between the actual speed and the target speed and between the actual distance and the target distance, to ascertain a value of the standard acceleration in dependence on the respective difference, in particular using a predefined relationship between the value of the standard acceleration and the difference; and in a driving progression range following the exit from the coasting mode, to effectuate a coasting exit acceleration having a value which is less than the respective value of the standard acceleration at least for a part of the driving progression range or for an entirety driving progression range.

16. A method for controlling a coasting mode of a vehicle in a context of a distance and speed control function of the vehicle, the method comprising:

determining that the vehicle, upon exit from the coasting mode, has an actual driving speed, which is below a target speed of the distance and speed control function, and has an actual distance to a preceding vehicle, which is above a target distance of the distance and speed control function;

in reaction thereto, effectuating a coasting exit acceleration of the vehicle reduced in relation to a standard acceleration of the distance and speed control function, in order to approximate the actual speed to the target speed and to approximate the actual distance to the target distance;

predicting a distance and speed profile of the vehicle in the coasting mode;

on a basis of the predicted distance and speed profile, ascertaining an exit driving progression for the exit from the coasting mode;

effectuating the exit from the coasting mode at the ascertained exit driving progression;

comparing, as a first comparison, the predicted distance and speed profile to a speed threshold value lying below the target speed;

comparing, as a second comparison, the predicted distance and speed profile to a distance threshold value lying above the target distance; and ascertaining the exit driving progression based on the first and second comparisons.

* * * * *